United States Patent [19]

Hunt

[11] Patent Number: 4,636,118
[45] Date of Patent: Jan. 13, 1987

[54] COOLANT SUPPLY EXTENSION MEMBER IN ROTATING CUTTING TOOL

[75] Inventor: Carl E. Hunt, Milford, Mich.

[73] Assignee: GTE Valeron Corporation, Troy, Mich.

[21] Appl. No.: 809,911

[22] Filed: Dec. 17, 1985

[51] Int. Cl.[4] .................. B23B 27/10; B23B 51/06
[52] U.S. Cl. ........................ 409/136; 29/DIG. 66; 29/DIG. 70; 279/20; 407/11; 408/59
[58] Field of Search .......................... 408/56-59; 409/136; 407/11; 279/20; 29/DIG. 64, DIG. 66, DIG. 67, DIG. 70

[56] References Cited

U.S. PATENT DOCUMENTS

| 2,008,031 | 7/1935 | Mitlner | 408/56 |
| 2,588,267 | 3/1952 | McLaughlin | 408/59 |
| 2,985,468 | 5/1961 | Shaw et al. | 279/20 |
| 3,333,489 | 8/1967 | Mossberg | 407/11 |
| 4,392,761 | 7/1983 | Eckle | 408/57 |
| 4,570,952 | 2/1986 | Heimbigner et al. | 279/20 |

FOREIGN PATENT DOCUMENTS

| 3129403 | 2/1983 | Fed. Rep. of Germany | 408/59 |
| 819417 | 9/1959 | United Kingdom | 279/20 |
| 699159 | 11/1979 | U.S.S.R. | 175/324 |

Primary Examiner—Lowell A. Larson
Assistant Examiner—Jerry Kearns
Attorney, Agent, or Firm—Witherspoon & Hargest

[57] ABSTRACT

A rotatable cylindrical extension member, and cutting tool incorporating such extension member, provided with a coolant inlet, for alignment with a ring bore, extending inwardly from the peripheral surface of the extension member for directing coolant towards the axis of the extension member when it is coupled to the cutting tool and rotated while coolant is being supplied to the inlet from the ring bore.

8 Claims, 4 Drawing Figures

COOLANT SUPPLY EXTENSION MEMBER IN ROTATING CUTTING TOOL

BACKGROUND OF THE INVENTION

1. Field of the Invention

The present invention is related to an extension member for a cutting tool for cutting a workpiece wherein there is relative cutting motion about an axis of rotation between a cutting member or plate mounted upon a tool shank and a workpiece. The coolant is supplied from a coolant supply means to the cutting member by means of aligned bores in a coolant supply member, coolant supply ring, extension member and a tool shank.

2. Description of the Prior Art

Presently, it is known to supply a cooling medium to a rotating cutting tool from a coolant supply means to a cutting member. For example, one known apparatus is described in U.S. Pat. No. 4,392,761 to Eckle. The rotary machinery tool described in the Eckle patent includes a coolant delivery system wherein coolant is supplied from a supply pipe through a series of bores to the cutting members or plates. The coolant is supplied during the cutting operation. The Eckle apparatus is particularly useful in those applications where the cutting tool performs a number of machining operations one after the other upon the same workpiece. In such operations, different cutting plates are used for different cutting operations on the same workpiece. It is highly desirable to automatically interchange the cutting plates throughout the process. Ordinarily it is necessary to disconnect and then reconnect the coolant supply system each time the cutting plates are changed. An object of the Eckle apparatus is to provide a system of the type described therein which provides automatic coupling of the coolant delivery apparatus during the cutting plate interchanging process. This is done by supplying a cooling medium to the cutting plates using a supply ring which is automatically connected to and disconnected from a coupling head during cutting plate changes. More particularly, when one cutting member has been replaced by another and the tool shank is caused to rotate, the supply ring is designed to rotate in the same direction by the friction between the tool shank and the supply ring which is positioned on the tool shank. In this manner, a sealing surface of a coupling piece radially projecting from the supply ring comes into engagement with a sealing surface of a coupling head so that coolant can pass through bores in the coupling head, coupling piece and supply ring and then on through a bore in the tool shank to the cutting members. In passing through the bore in the tool shank the coolant first passes through one or more radially oriented tool shank bores which intersect with an axially oriented tool shank bore. In particular, the coolant flows from the bore in the supply ring, through the radial bore or bores in the tool shank and then through the axial bore in the tool shank to be emitted at the cutting members. In such apparatus the coolant is flowing from a stationary supply ring bore to the radial bores of the type referred to, such radial bores extending into a rotating tool shank. The effect of the rotation of the tool shank is to subject the coolant entering the radially oriented tool shank bores to centrifugal force which tends to resist the flow of the coolant towards the axial bore of the tool shank.

In such prior art apparatus, the tool shank is coupled directly to the drive spindle, the tool shank being inserted into a mating aperture to assure a satisfactory coupling. If a tool shank having a larger or smaller diameter is used, a different machine must be used or the drive spindle of the existing machine must be replaced with one having a correspondingly larger or smaller mating aperture. This is undesirable in that not only is it necessary to maintain in stock a full range of drive spindles but changing from one spindle to another can be a time consuming process. In addition, since the tool shank is coupled directly to the drive spindle, each tool shank put into service must include means for diverting the coolant from a supply ring to the axial bore of the tool shank. In other words, each tool shank requires one or more radial bores in addition to the axial bore which extends to the cutting members.

It is desirable to eliminate the need for stocking a plurality of tool shanks requiring radial as well as axial coolant supply bores, and a plurality of drive spindles of varying dimensions. To this end it is desirable to provide an extension member which serves as a coupling between a drive spindle and a tool shank. It is further desirable to provide such an extension member which tends to draw the coolant towards the longitudinal axis of the axial bore of the extension member during rotation thereof. In addition, it is desirable to provide such apparatus wherein a positive scooping effect serves to further pull the coolant towards the longitudinal axis of the axial bore of the extension member during rotation. It is also desirable to provide such machinery wherein the centrifugal force acting against the coolant is resisted.

SUMMARY OF THE INVENTION

This invention achieves these and other results by providing a rotatable cylindrical extension member for attachment to a drive spindle of a cutting tool of the type for cutting a workpiece wherein there is relative cutting motion about an axis of rotation between a cutting member mounted upon a tool shank of the type for attachment to the extension member and having an axially extending bore therethrough, and the workpiece, and wherein coolant is supplied from a coolant supply means through a ring bore of a coolant supply ring rotatably mounted upon the extension member and through the bore in the tool shank to the cutting member. The cylindrical extension member comprises a longitudinal axis, a first end for coupling to the drive spindle, and a second end for coupling to the tool shank. A coolant inlet means, for alignment with the ring bore, extends inwardly from the peripheral surface of the extension member for directing the coolant towards the longitudinal axis when the extension member is coupled to the drive spindle and rotated while coolant is being supplied to the inlet means from the ring bore. A coolant outlet is provided at the second end for supplying coolant through the bore of the tool shank to the cutting member, and a longitudinal bore defined by a longitudinal bore wall extends from the inlet means to the outlet and about the longitudinal axis.

DESCRIPTION OF THE PREFERRED EMBODIMENT

Figure 1:
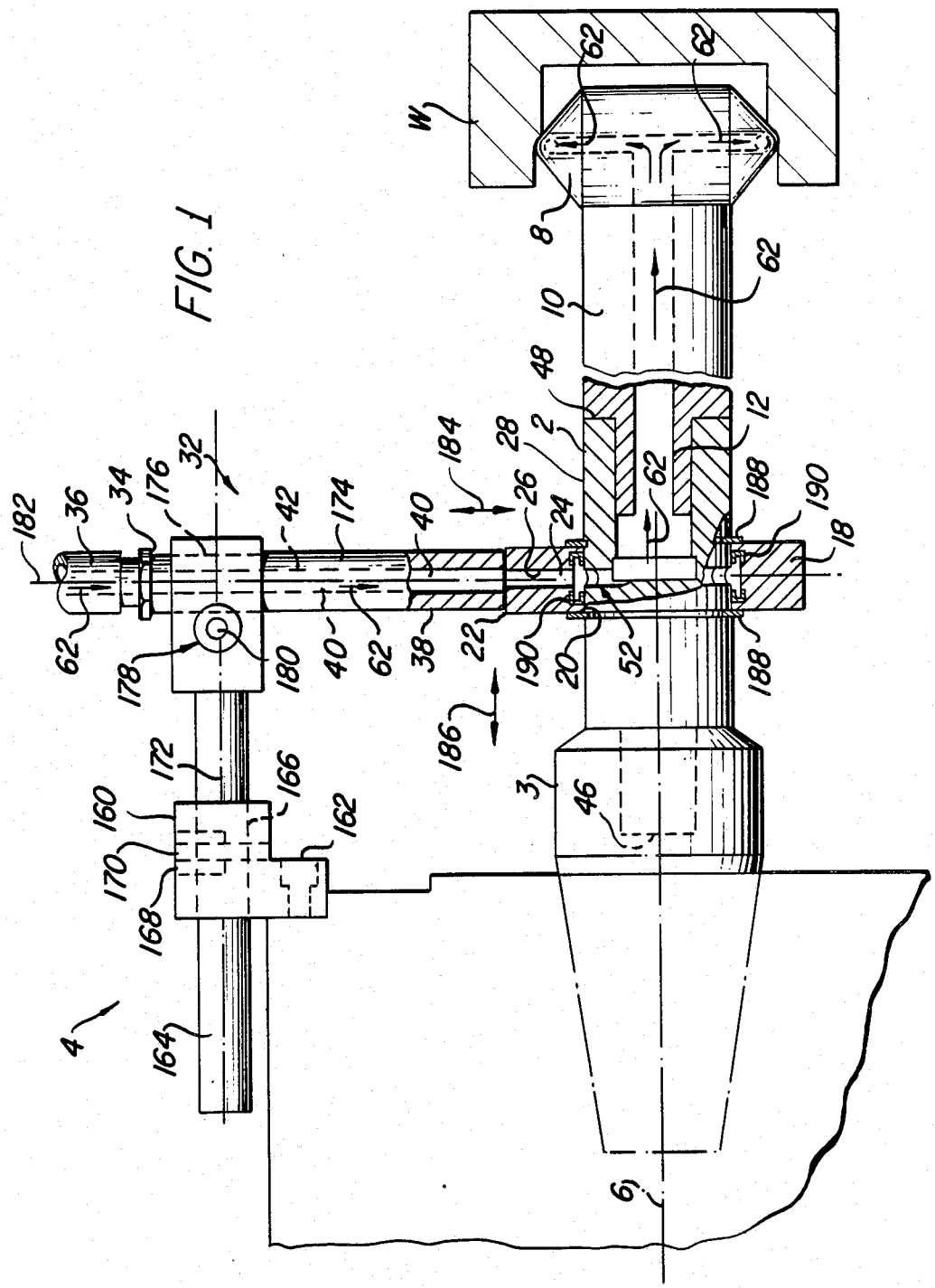
FIG. 1 is a sise view partially in cross section of one embodiment of a cutting tool and extension member of the present invention.

The embodiment of this invention which is illustrated in the drawings is particularly suited for achieving the objects of this invention. FIG. 1 depicts a rotatable cylindrical extension member 2 for attachment to a drive spindle 3 of a cutting tool 4 of the type for cutting a workpiece w wherein there is relative cutting motion about an axis of rotation 6 between a cutting member 8, mounted upon a tool shank 10 of a type for attachment to the extension member 2 and having an axially extending bore 12 therethrough, and workpiece w. In the embodiment depicted in FIG. 1, drive spindle 3 is caused to rotate about axis 6 in a manner known in the art. For example, drive spindle 3 can be caused to rotate in a known manner by a motor which is not shown. Coolant is supplied from a coolant supply means through a ring bore of a coolant supply ring 18 which is rotatably mounted upon extension member 2 and through the bore in the tool shank to the cutting member. For example, the ring 18 includes an inner peripheral surface 20 and an outer peripheral surface 22. Ring 18 includes a coolant supply ring bore 24 defined by a ring bore wall 26 which extends from inner surface 20 to outer surface 22. The relationship between ring 18 and extension member 2 is such that when the extension member 2 is caused to rotate the supply ring will be caused to rotate in the same direction as a result of friction between the outer surface 28 of the extension member 2 and the surface 20 of ring 18. However, continued rotation of the ring 18 is terminated in a known manner when the ring is rotated to the extent that the coolant supply ring bore 24 is aligned with the stationary coolant supply member 32.

Coolant supply member 32, which is coupled to the cutting tool 4, includes a supply inlet 34 coupled to a coolant supply means including hose 36 in a known manner. Supply member 32 also includes a supply outlet 38 and a supply bore 40 defined by a supply bore wall 42 which extends from the supply inlet 34 to the supply outlet 38.

In the apparatus thus far described, extension member 2 and ring 18 coupled thereto are rotated until coolant supply ring bore 24 is aligned with supply bore 40 at which point the extension member 2 will continue to rotate so that the cutting members 8 rotate to cut the workpiece w, and the ring will come to rest in a known manner. When bores 24 and 40 are so aligned, coolant is supplied from the coolant supply means at hose 36 and passes through supply bore 40, ring bore 24, a bore in the extension member 2, bore 12, and on to the cutting members 8 as further described herein.

Figure 2:
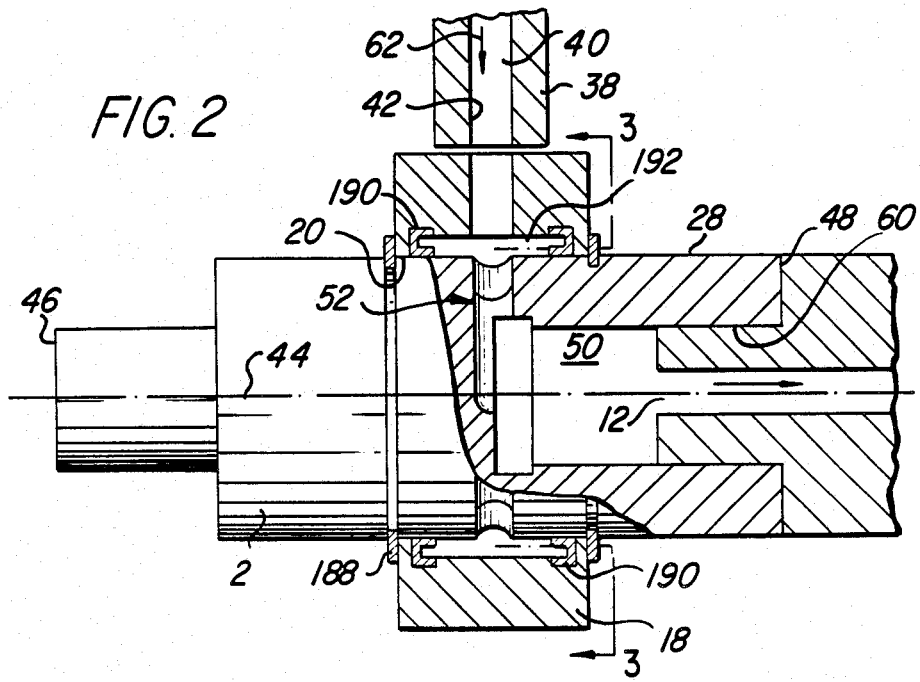
FIG. 2 is a partial end view of the apparatus depicted in FIG. 1.
Figure 3:
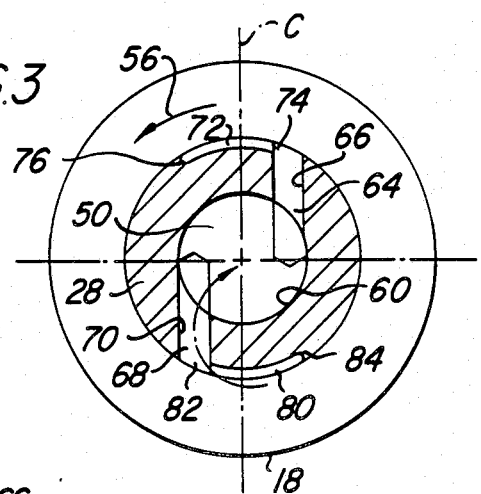
FIG. 3 is a view taken along line 3—3 of FIG. 2.
Figure 4:
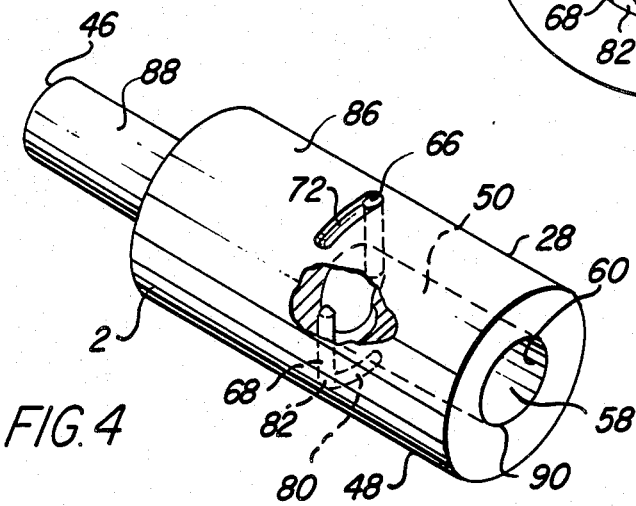
FIG. 4 is a perspective view of the extension member of the present invention.

FIGS. 2 to 4 depict the rotatable cylindrical extension member 2 in greater detail. In particular, the extension member 2 is depicted as including a longitudinal axis 44. When extension member 2 is mounted to the cutting tool 4 as, for example, depicted in FIG. 1, axis 44 merges with the axis of rotation 6. Extension member 2 includes a first end 46 for coupling to the drive spindle 3. Extension member 2 also includes a second end 48 for coupling to the tool shank 10. The extension member 2 can be coupled to the drive spindle and the tool shank using known coupling techniques, the specific manner of coupling forming no part of this invention. One known manner of coupling is the Valenite type floating wedge connection described in, for example, the Valenite publication IBM No. 27-06-411, Pub. No. FTS-100, August, 1985. Valenite is a division of GTE Valeron Corporation.

A coolant inlet means 52 for alignment with the ring bore 24 extends inwardly from the peripheral surface 28 of extension member 2, for directing the coolant towards the axis 44 when extension member 2 is coupled to the drive spindle 3 and rotated in the direction identified by arrow 56 while coolant is being supplied to the inlet means 52 from the ring bore 24. A coolant outlet 58 is provided at the second end 48 for supplying coolant through the bore 12 of the tool shank to the cutting members 8. In particular, the longitudinal bore 50 is defined by a longitudinal bore wall 60 which extends from the inlet 52 to the coolant outlet 58 and about the longitudinal axis 44. By providing such structure, coolant passes in the direction of arrows 62 from the hose 36 to the cutting members 8 as described herein in greater detail.

In the preferred embodiment the inlet means 52 includes at least one inlet bore defined by an inlet bore wall extending from the peripheral surface 28 to the longitudinal bore 50. Preferably, the bore is positioned relative to a centerline, defining an extension member diameter, such that the inlet bore is positioned behind the centerline with respect to the direction of intended rotation of the extension member. Such structure provides means for positively pulling the coolant towards the longitudinal axis when the extension member is coupled to the drive spindle and rotated while coolant is being supplied to the inlet means from the ring bore. Preferably, two or more such inlet bores are provided. For example, in the embodiment depicted in the drawings, inlet means 52 includes a first inlet bore 64 defined by a first inlet bore wall 66 extending from the peripheral surface 28 to the longitudinal bore wall 50 and a second inlet bore 68 defined by a second inlet bore wall 70 extending from the peripheral surface 28 to the longitudinal bore 50. Inlet bores 64 and 68 are positioned behind the centerline C with respect to the direction of intended rotation of extension member 2, identified by arrow 56. When a plurality of inlet bores are provided they are preferably equally spaced circumferentially at the peripheral surface 28. Although not necessary, in the embodiment depicted int the drawings, the first inlet bore 64 and second inlet bore 68 are substantially tangent with the longitudinal bore wall 60, bores 64 and 68 being substantially parallel with each other as depicted in FIG. 3.

Although not necessary, in the preferred embodiment the extension member 2 includes a channel associated with each inlet bore, each such channel partially extending circumferentially about the peripheral surface 28 and having a first end which merges into an inlet bore and a second end spaced from the first end in the direction of intended rotation of the extension member 2. For example, in the embodiment depicted in the drawings, the extension member 2 includes a first channel 72 partially extending circumferentially about the peripheral surface 28 and having a first end 74 which merges into the first inlet bore 64 and a second end 76 spaced from the first end 74 in the direction of intended rotation of the extension member 2 as represented in the embodiment depicted in FIG. 3 by arrow 56. Extension member 2 also includes a second channel 80 partially extending circumferentially about the peripheral surface 28 and having one end 82 which merges into the second inlet bore 68 and another end 84 spaced from the one end 82 in the direction of intended rotation of the extension member 2.

As depicted in FIGS. 2 and 3, preferably the channels 72 and 80 are scoop-like in configuration having the leading edge of the scoop-like channels formed at ends 76 and 84.

The cutting members 8 are mountable upon tool shank 10 in a known manner.

As best depicted in FIG. 4, extension member 2 includes a cylindrical portion 86 through which longitudinal bore 50 extends and an extension 88 of reduced dimension, relative to the diameter of the cylindrical portion 86. Extension 88 forms the first end 46 of the extension member 2 for coupling to drive spindle 3 as depicted in FIG. 1. The second end 48 of extension member 2 includes an axially extending opening 90 for coupling the tool shank 10 to the extension member as depicted in FIGS. 1 and 2. In the embodiment depicted in the drawings such opening 90 in the second end 48 corresponds to the end of the longitudinal bore 50.

In the embodiment depicted in FIG. 1 the supply member 32 includes a mounting block 160. Although not necessary, block 160 can be coupled to the cutting tool 4 as, for example, by means of bolts 162, only one of which is shown in the drawings. An elongated cylindrical pipe holder 164 is coupled to the mounting block, pipe holder 164 extending through a cylindrical opening 166 and being held in place by a pipe lock 168 and locking screw 170. Pipe holder 164 extends along a first longitudinal axis 172 which is substantially parallel to the axis of rotation 6 when the mounting block 160 is coupled to the cutting tool 4 as shown. An elongated cylindrical supply pipe 174 is also provided. Supply pipe 174 is slideably coupled to the pipe holder, supply pipe 174 extending through a cylindrical opening 176 in the pipe holder 164 and being held in place by a pipe lock 178 and locking screw 180. Loosening of screw 180 allows the supply pipe 174 to slide along a second longitudinal axis 182 towards and away from the outer peripheral surface 22 of ring 18 to the extent desired to control the spacing in the direction identified by arrow 184 between surface 22 and supply outlet 38. In the embodiment depicted in the drawings, the supply pipe 174 includes the supply inlet 34 at one end, the supply outlet 38 at the other end, and the supply bore 40 defined by supply bore wall 42 extending from inlet 34 to outlet 38. Preferably, pipe holder 164 is moveably coupled to the mounting block 160 so that loosening of screw 170 allows the pipe holder to slide, for example, along axis 172 to the extent desired to control the location, in the direction, for example, identified by arrow 186, of the supply outlet 38 along surface 22.

In operation, an extension member 2 having the desired dimensions is coupled to the drive spindle 3, and a tool shank 10 is coupled to the extension member, as described herein. A supply ring 18 is then mounted upon the extension member 2 forming a tight fit as described herein. In mounting the supply ring 18, locking rings 188 hold the supply ring 18 in place so that bore 24 is aligned with the coolant inlet means 52 of extension member 2, the coolant inlet means 52 merging with the axially oriented bore 50 of extension member 2 and the axially oriented bore 12 of the tool shank 10 inserted withing bore 50. Seals 190 are provided to prevent leakage at the extension member supply ring interface, the dimensions of this interface being exaggerated in the drawings so that the detail discussed herein can be adequately described. An opening 192 extends about the periphery 20 of the ring 18 in a known manner. The coolant supply apparatus 32 has either already been adjusted as described herein, or is subsequently adjusted after the supply ring 18 is properly in place. When the apparatus is ready for operation, the extension member 2 and ring 18 coupled thereto are rotated until ring bore 24 and outlet 38 are aligned at which point the extension member 2 continues to rotate so that the cutting operation is effected, and the ring comes to rest in a known manner. During the cutting operation, coolant flows in the direction of the arrows designated 62. In other words, the coolant flows from hose 36, through bores 40 and 24 and around opening 192. During the rotation of extension member 2 the leading edges 76 and 84 of the scoop-like channels 72 and 80, respectively, exert a positive scooping effect to move coolant along the channels 72 and 80 towards the inlet bores 64 and 68, respectively. The coolant is drawn from the channels 72 and 80 through inlet bores 64 and 68, respectively, and towards the longitudinal axis 44. The coolant continues by flowing through bore 12 to the cutting members 8. During the flow of coolant in the direction indicated by arrows 62, the centrifugal force acting against the coolant is resisted. If a replacement tool shank having a larger or smaller diameter is needed, extension member 2 can be replaced with another extension member having a first end dimensioned to be coupled to drive spindle 3 and a second end dimensioned to receive the replacement tool shank. As such, drive spindle 3 need not be replaced. Since the extension member includes the radial bores for directing the coolant towards the longitudinal axis of the extension member and the tool shank, the radially oriented bores of prior art tool shanks have been omitted.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A rotatable cylindrical extension member for attachment to a drive spindle of a cutting tool of the type for cutting a workpiece wherein there is relative cutting motion about an axis of rotation between a cutting member mounted upon a tool shank of the type for attachment to said extension member and having an axially extending bore therethrough, and said workpiece, and wherein coolant is supplied from a coolant supply means through a ring bore of a coolant supply ring rotatably mounted upon said extension member and through said bore in said tool shank to said cutting member, said cylindrical extension member comprising a longitudinal axis, a first end for coupling to said drive spindle, a second end for coupling to said tool shank, a coolant inlet means, for alignment with said ring bore, extending inwardly from the peripheral surface of said extension member, for directing said coolant towards said longitudinal axis when said extension member is coupled to said drive spindle and rotated while coolant is being supplied to said inlet means from said ring bore, said inlet means comprising two or more inlet bores each defined by an inlet bore wall extending from said peripheral surface to said longitudinal bore, said inlet bores being equally spaced circumferentially of said peripheral surface and being positioned relative to a centerline, defining an extension member diameter, such that each of said inlet bores is positioned behind said centerline with respect to the direction of intended rotation of said extension member; a coolant outlet at said second end for supplying coolant through said bore of said tool shank to said cutting member; a longitudinal bore defined by a longitudinal bore wall extending from said inlet means to said outlet and about said longitudinal axis; and, means adjacent said inlet bores at said peripheral surface for exerting a positive scooping effect to move coolant along said surface towards said inlet bores so that coolant is drawn from said surface through said inlet bores and towards said longitudinal axis, said exerting means formed such that each of said inlet bores includes a channel partially extending circumferentially about said peripheral surface and having a first end which merges into the respective of said two or more of said inlet bores and a second end spaced from said first end in the direction of intended rotation of said extension member, each channel being scoop-like in configuration and having a leading edge which forms said second end.

2. In a cutting tool, having an extension member coupled to a drive spindle, for cutting a workpiece wherein there is relative cutting motion about an axis of rotation between a cutting member mounted upon a tool shank of the type for attachment to said extension member and having an axially extending bore therethrough, and said workpiece, and wherein coolant is supplied from a coolant supply means through a ring bore of a coolant supply ring rotatably mounted upon said extension member and through said bore in said tool shank to said cutting member, the improvement comprising an extension member having a longitudinal axis, a first end coupled to said drive spindle for rotation thereby, a second end for coupling to said tool shank, a coolant inlet means, for alignment with said ring bore, extending inwardly from the peripheral surface of said extension member, for directing said coolant towards said longitudinal axis when said extension member is being rotated and coolant is being supplied to said inlet means from said ring bore, said inlet means comprising two or more inlet bores each defined by an inlet bore wall extending from said peripheral surface to said longitudinal bore, said inlet bores being equally spaced circumferentially of said peripheral surface and being positioned relative to a centerline, defining an extension member diameter, such that each of said inlet bores is positioned behind said centerline with respect to the direction of intended rotation of said extension member; a coolant outlet at said second end for supplying coolant through said bore of said tool shank to said cutting member; and longitudinal bore defined by a longitudinal bore wall extending from said inlet means to said outlet and about said longitudinal axis; and, means adjacent said inlet bores at said peripheral surface for exerting a positive scooping effect to move coolant along said surface towards said inlet bores so that coolant is drawn from said surface through said inlet bores and towards said longitudinal axis, said exerting means formed such that each of said inlet bores includes a channel partially extending circumferentially about said peripheral surface and having a first end which merges into the respective of said two or more of said inlet bores and a second end spaced from said first end in the direction of intended rotation of said extension member, each channel being scoop-like in configuration and having a leading edge which forms said second end.

3. A rotatable cylindrical extension member for attachment to a drive spindle of a cutting tool of the type for cutting a workpiece wherein there is relative cutting motion about an axis of rotation between a cutting member mounted upon a tool shank of the type for attachment to said extension member and having an axially extending bore therethrough, and said workpiece, and wherein coolant is supplied from a coolant supply means through a ring bore of a coolant supply ring rotatably mounted upon said extension member and through said bore in said tool shank to said cutting member, said cylindrical extension member comprising a longitudinal axis, a first end for coupling to said drive spindle, a second end for coupling to said tool shank, a coolant inlet means, for alignment with said ring bore, said inlet means comprising a first inlet bore and a second inlet bore for positively pulling said coolant towards said longitudinal axis when said extension member is coupled to said drive spindle and rotated while coolant is being supplied to said inlet means from said ring bore, said first and second inlet bores being positioned relative to a centerline, defining an extension member diameter, such that said first and second inlet bores are positioned behind said centerline with respect to the direction of intended rotation of said extension member, the first inlet bore being defined by a first inlet bore wall extending inwardly from said peripheral surface to said longitudinal bore and being substantially tangent with said longitudinal bore wall, and said second inlet bore being defined by a second inlet bore wall extending inwardly from said peripheral surface to said longitudinal bore and being substantially tangent with said longitudinal bore wall, said first inlet bore being substantially parallel with said second inlet bore; a coolant outlet at said second end for supplying coolant through said bore of said tool shank to said cutting member; and, a longitudinal bore defined by a longitudinal bore wall extending from said inlet means to said outlet and about said longitudinal axis.

4. The coolant supply apparatus fo claim 3 further including a first channel partially extending circumferentially about said peripheral surface and having a first end which merges into said first inlet bore and a second end spaced from said first end in the direction of intended rotation of said extension member, and a second channel partially extending circumferentially about said peripheral surface and having one end which merges into said second inlet bore and another end spaced from said one end in the direction of intended rotation of said extension member.

5. In a cutting tool, having an extension member coupled to a drive spindle, fur cutting a workpiece wherein there is relative cutting motion about an axis of rotation between a cutting member mounted upon a tool shank of the type for attachment to said extension member and having an axially extending bore therethrough, and said workpiece, and wherein coolant is supplied from a coolant supply means through a ring bore of a coolant supply ring rotatably mounted upon said extension member and through said bore in said tool shank to said cutting member, the improvement comprising an extension member having a longitudinal axis, a first end coupled to said drive spindle for rotation thereby, a second end for coupling to said tool shank, a coolant inlet means, for alignment with said ring bore, said inlet means comprising a first inlet bore and a second inlet bore for positively pulling said coolant towards said longitudinal axis when said extension member is coupled to said drive spindle and rotated while coolant is being supplied to said inlet means from said ring bore, said first and second inlet bores being positioned relative to a centerline, defining an extension member diameter, such that said first and second inlet bores are positioned behind said centerline with respect to the direction of intended rotation of said extension member, the first inlet bore being defined by a first inlet bore wall extending inwardly from said peripheral surface to said longitudinal bore and being substantially tangent with said longitudinal bore wall, and said second inlet bore being defined by a second inlet bore wall extending inwardly from said peripheral surface to said longitudinal bore and being substantially tangent with said longitudinal bore wall, said first inlet bore being substantially parallel with said second inlet bore; a coolant outlet at said second end for supplying coolant through said bore of said tool shank to said cutting member; and, a longitudinal bore defined by a longitudinal bore wall extending from said inlet means to said outlet and about said longitudinal axis.

6. The coolant supply apparatus of claim 5 wherein said channels are scoop-like in configuration and wherein the leading edge of each of said scoop-like channels forms said second and another ends.

7. The cutting tool of claim 5 further including a first channel partially extending circumferentially about said peripheral surface and having a first end which merges into said first inlet bore and a second end spaced from said first end in the direction of intended rotation of said extension member, and a second channel partially extending circumferentially about said peripheral surface and having one end which merges into said second inlet bore and another end spaced from said one end in the direction of intended rotation of said extension member.

8. The cutting tool of claim 2 wherein said channels are scoop-like in configuration and wherein the leading edge of each of said scoop-like channels forms said second and another ends.

* * * * *